United States Patent
Serrano et al.

(10) Patent No.: US 11,372,933 B2
(45) Date of Patent: Jun. 28, 2022

(54) SYSTEMS AND METHODS USING COMMERCE PLATFORM CHECKOUT PAGES FOR MERCHANT TRANSACTIONS

(71) Applicant: Stripe, Inc., San Francisco, CA (US)

(72) Inventors: Eduardo Serrano, Mexico City (MX); Jenan Wise, San Francisco, CA (US); Yue Bu, San Francisco, CA (US)

(73) Assignee: STRIPE, INC., San Francisco, CA (US)

( * ) Notice: Subject to any disclaimer, the term of this patent is extended or adjusted under 35 U.S.C. 154(b) by 29 days.

(21) Appl. No.: 16/576,400

(22) Filed: Sep. 19, 2019

(65) Prior Publication Data

US 2020/0098027 A1 Mar. 26, 2020

Related U.S. Application Data

(60) Provisional application No. 62/734,141, filed on Sep. 20, 2018.

(51) Int. Cl.
*G06Q 30/06* (2012.01)
*G06Q 20/38* (2012.01)
(Continued)

(52) U.S. Cl.
CPC ............ *G06F 16/95* (2019.01); *G06Q 20/12* (2013.01); *G06Q 30/0619* (2013.01);
(Continued)

(58) Field of Classification Search
None
See application file for complete search history.

(56) References Cited

U.S. PATENT DOCUMENTS 7,249,056 B1 * 7/2007 Crouthamel ........... G06Q 30/06
705/26.41
8,577,803 B2 * 11/2013 Chatterjee ............ G06Q 20/386
705/41

(Continued)

FOREIGN PATENT DOCUMENTS

WO    2015200414    12/2015

OTHER PUBLICATIONS

Sumeet P, Implementing Webhook Handler inPython, Dec. 1, 2016 (Year: 2016).*

(Continued)

*Primary Examiner* — John W Hayes
*Assistant Examiner* — Dennis G Keritsis
(74) *Attorney, Agent, or Firm* — Womble Bond Dickinson (US) LLP

(57) ABSTRACT

A system and method for a commerce platform system conducting a transaction with a customer system of a merchant system. The method may include receiving, over a communications network from the customer system, a request to purchase a product offered for sale by the merchant system, the request to purchase the product generated within a user interface presented to the customer system by the merchant system. The method may also include redirecting the customer system to a payment page served by the commerce platform system, wherein the payment page presents the product of the merchant for purchase by the customer system. Furthermore, the method may include clearing, with one or more authorization network systems, the purchase of the product from the payment page by the customer system, and redirecting the customer system back to a second user interface provided to the customer system by the merchant system.

19 Claims, 6 Drawing Sheets

(51) Int. Cl.
  *G06Q 20/40* (2012.01)
  *G06Q 20/12* (2012.01)
  *G06F 16/95* (2019.01)
  *H04L 67/02* (2022.01)

(52) U.S. Cl.
  CPC .......... *H04L 67/02* (2013.01); *G06Q 20/382* (2013.01); *G06Q 20/401* (2013.01)

(56) References Cited

U.S. PATENT DOCUMENTS

| | | | |
|---|---|---|---|
| 9,626,713 B2* | 4/2017 | Natarajan | G06Q 30/0635 |
| 9,830,596 B2* | 11/2017 | Collison | G06Q 20/102 |
| 10,339,505 B2* | 7/2019 | Pasupulati | G06Q 20/02 |
| 2007/0244831 A1* | 10/2007 | Kuo | G06Q 20/3829 |
| | | | 705/67 |
| 2010/0199197 A1* | 8/2010 | Faletski | G06F 16/9577 |
| | | | 715/760 |
| 2010/0293106 A1 | 11/2010 | Rhoads et al. | |
| 2010/0299212 A1 | 11/2010 | Graylin et al. | |
| 2011/0246293 A1* | 10/2011 | Hayward | G06Q 30/0207 |
| | | | 705/14.51 |
| 2012/0209749 A1* | 8/2012 | Hammad | G06Q 20/3674 |
| | | | 705/27.1 |
| 2012/0226614 A1 | 9/2012 | Gura et al. | |
| 2012/0259710 A1 | 10/2012 | Peterson | |
| 2013/0124306 A1* | 5/2013 | Hutchinson | G06Q 30/02 |
| | | | 705/14.47 |
| 2014/0052617 A1* | 2/2014 | Chawla | G06Q 20/102 |
| | | | 705/39 |
| 2014/0136346 A1* | 5/2014 | Teso | G06Q 20/384 |
| | | | 705/14.72 |
| 2015/0026049 A1* | 1/2015 | Theurer | G06Q 20/28 |
| | | | 705/41 |
| 2015/0066746 A1 | 3/2015 | Nichols et al. | |
| 2015/0332230 A1* | 11/2015 | Gaines | G06Q 30/0641 |
| | | | 705/27.1 |
| 2016/0247182 A1 | 8/2016 | Peterson et al. | |
| 2017/0046759 A1* | 2/2017 | Chandrasekaran | G06Q 30/0635 |
| 2017/0278085 A1 | 9/2017 | Anderson et al. | |
| 2018/0005538 A1* | 1/2018 | Rockett | G06F 16/951 |
| 2018/0232817 A1* | 8/2018 | Isaacson | G06F 16/951 |

OTHER PUBLICATIONS asp.net WebHooks handlers (Year: 2020).*
Use incoming webhooks to get real-timeupdates (Year: 2022).*
Jeff Lindsay, Web hooks to revolutionize the web (Year: 2018).*
International Search Report for Application No. PCT/US19/52186, dated Dec. 11, 2019, 11 pages.
International Preliminary Report and Written Opinion on the Patentability of Application No. PCT/US2019/052186 dated Apr. 1, 2021, 9 pages.

* cited by examiner

SYSTEMS AND METHODS USING COMMERCE PLATFORM CHECKOUT PAGES FOR MERCHANT TRANSACTIONS

PRIORITY

The present application is a non-provisional of, and claims the benefit of, U.S. Provisional Application No. 62/734,141, filed Sep. 20, 2018, which is incorporated by reference in its entirety.

BACKGROUND

Merchants, such as grocers, car services, dry cleaning services, etc., can provide their products to customers via web pages advertising such products and servers, or via mobile built applications (e.g., apps) of the merchant. To collect fees for products or services sought to be purchased by the customer, the merchant typically will have to add payment processing to their website or app. However, integration of payment processing into a web page or app is not a trivial task. Because payment processing involves interacting with card networks (e.g., Europay, Mastercard, Visa, etc. systems), banking networks, and potentially other systems, the design and development complexity is increased. Furthermore, payment processing involves the handling of sensitive financial information of the customer (e.g., card data, customer identification data, etc.), which can place Payment Card Industry (PCI) data security compliance requirements on the merchant's web page, merchant servers providing the web page, mobile applications, etc., which further complicates the design and implementation of the merchant's systems.

Some merchants will attempt to solve the above mentioned problems of performing merchant payment processing by using a commerce platform to perform payment processing. A commerce platform may be a system or entity that performs payment processing on behalf of others, such as the merchant. The commerce platform may provide application programming interfaces (APIs), software development kits (SDKs), etc. for integrating into the merchant web page or app. However, using a commerce platform may also be difficult and time consuming, including such tasks as setting up a payments server, dealing with secrets management (e.g., encryption key management), and building complex client-side user interfaces, etc. Even after an integration is complete, adding new capabilities to address changing needs (e.g. new payment methods, such as Apple Pay™) or due to external changes (e.g., SCA) requires significant technical work.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
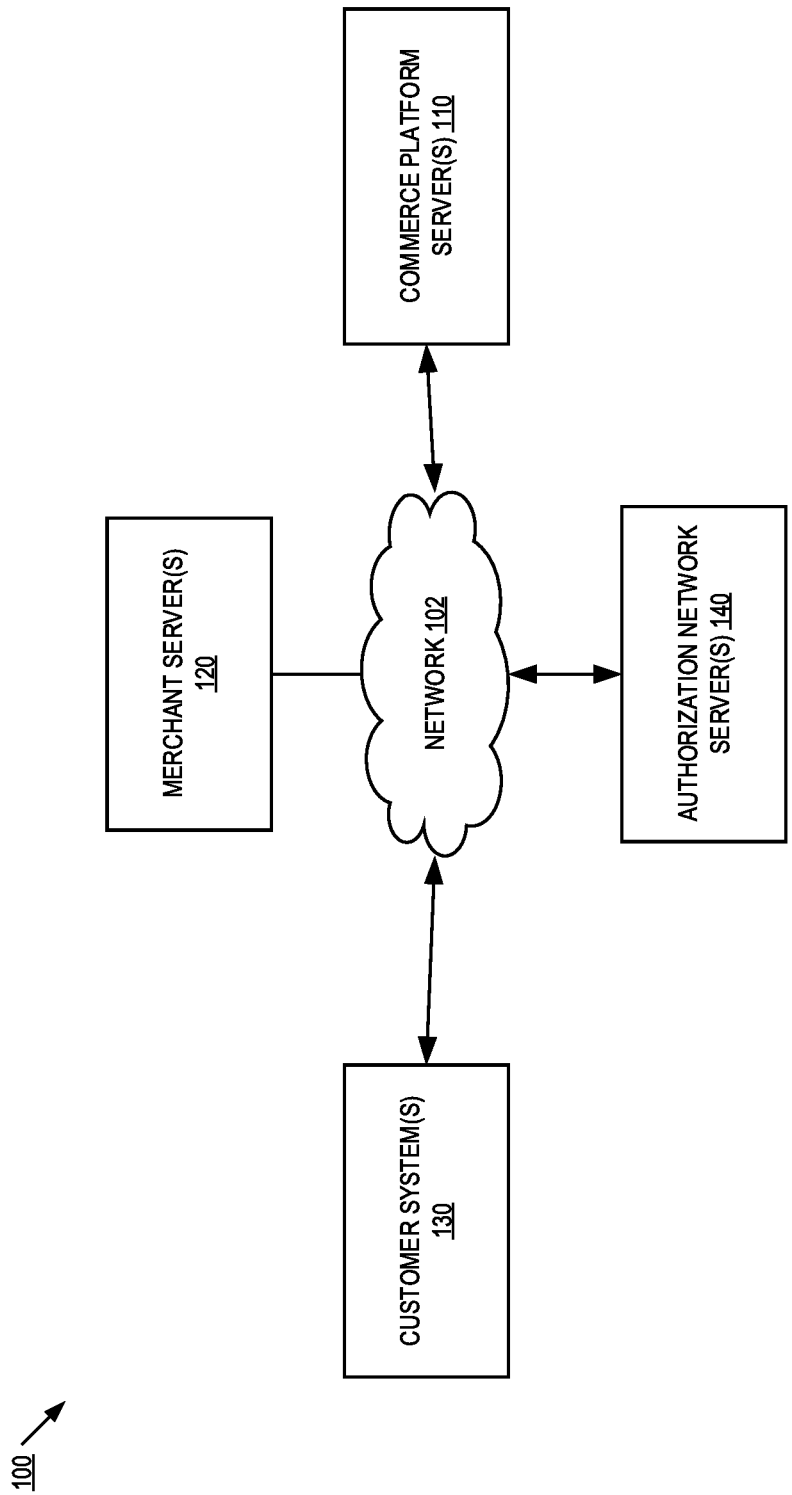
FIG. 1 is a block diagram of an exemplary system architecture for merchant checkout using a commerce platform.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "redirecting", "clearing", "determining", "generating", "associating", "identifying", "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for merchant checkout using a commerce platform.

Figure 6:
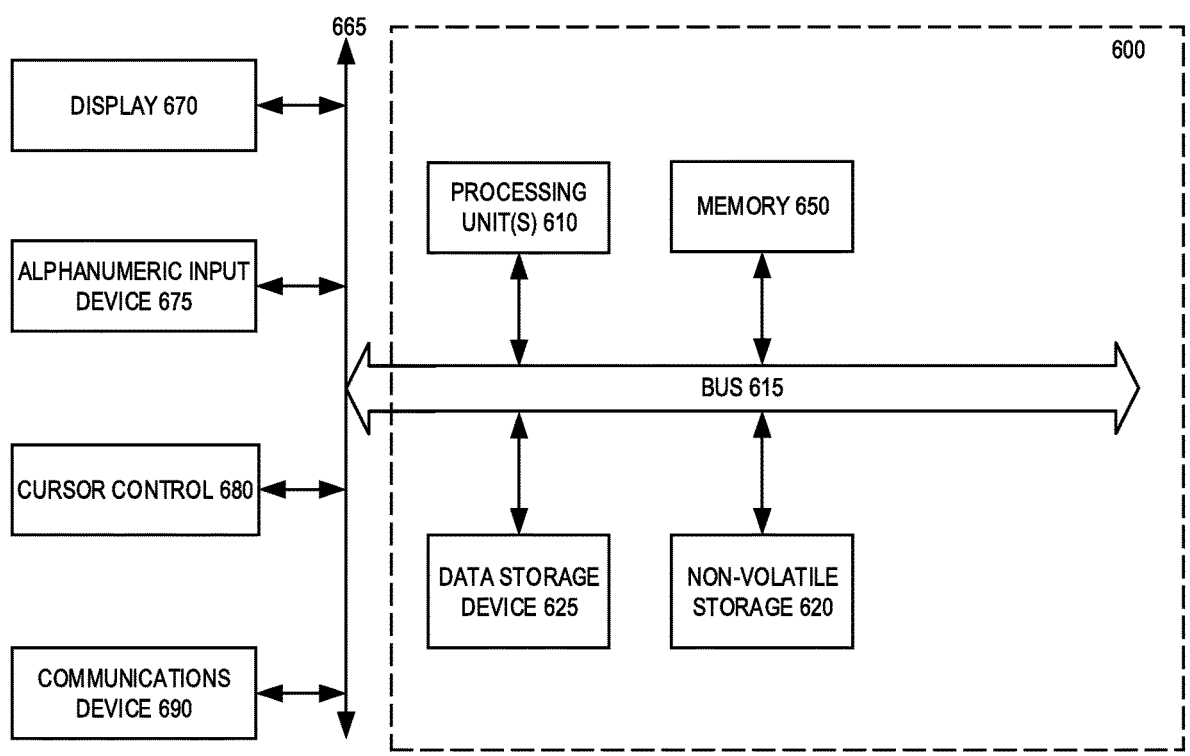
FIG. 6 is one embodiment of a computer system that may be used to support the systems and operations discussed herein.

In embodiments, the architecture includes one or more customer system(s) 130, one or more merchant server(s) 120, one or more commerce platform server(s) 110, and one or more authentication network server(s) 140. In one embodiment, the one or more customer system(s) 130 may be computing devices, such as a smartphone, tablet computer, laptop computer, or other hardware device that enables a customer to access a web page or application of a merchant associated with merchant server(s) 120. In one embodiment, the one or more merchant server(s) 120, one or more commerce platform server(s) 130, and one or more authentication network server(s) 140 are also computing devices, such as server computers, desktop computers, etc. Each of the computing systems include typical computing device hardware, such as one or more processors, memory, network interfaces, etc., as illustrated in FIG. 6 below.

Furthermore, the one or more customer system(s) 130, one or more merchant server(s) 120, one or more commerce platform server(s) 110, and one or more authentication network server(s) 140 may be coupled to a network 102, such as the internet, a wide area network, a local area network, a cellular communications network, or a combination of networks, and communicate with one another using any of the standard protocols for the exchange of information. In embodiments, the protocols can include secure communications protocols, such transport layer security (TLS), secure socket layer (SSL), hypertext transfer protocol secure (HTTPS), as well as other cryptographic or secure protocols for the exchange of information. In one embodiment, one or more of the customer system(s) 130, merchant server(s) 120, commerce platform server(s) 110, and authentication network server(s) 140 may run on one Local Area Network (LAN) and may be incorporated into the same physical or logical system, or different physical or logical systems. Alternatively, one or more of the one or more of the customer system(s) 130, merchant server(s) 120, commerce platform server(s) 110, and authentication network server(s) 140 may reside on different LANs, wide area networks, cellular telephone networks, etc. that may be coupled together via the Internet but separated by firewalls, routers, and/or other network devices. In one embodiment, one or more of the merchant server(s) 120, commerce platform server(s) 110, and authentication network server(s) 140 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, the commerce platform server(s) 110 enables merchant server(s) 120 to utilize payment pages, as discussed herein. In embodiments, a payment page is a checkout interface hosted by commerce platform server(s) 110 where a customer system 130 can securely enter their payment details (e.g., name, card, identification, billing address, etc. data) at a web page or application page that resolves at the commerce platform server(s) 110, and not the merchant server(s) 120. In embodiments, the payment page may be obtained in response to a customer of customer system 130 selecting a link, icon, image, etc. on a merchant web page, which represents a product (e.g., good and/or service) for sale by the merchant associated with the link, icon, image, etc. The payment page is hosted by the commerce platform server(s) 110 to prevent the merchant server(s) 130 and merchant web pages/apps (e.g., merchant web pages/app 332 in FIG. 3) from being subject to PCI or SCA compliance requirements. Instead, the payment pages are a series of one or more user interface pages, such as web pages, generated by the commerce platform server(s) 110 in which the customer's personal and/or financial information is collected, and then used to clear, approve, etc., a transaction with commerce platform server(s) 140 for the selected product and/or service.

In embodiments, payment pages provided by the commerce platform server(s) 110 for use by the merchant server(s) 120 are a powerful, drop-in solution to implement a checkout flow that minimizes the development and testing requirements places on engineers of a merchant. In embodiments, the commerce platform payment pages accept credit card payments, and support browser wallets (e.g., Apple Pay™, Google Pay™, etc.), for the payment of products offered by merchant server(s) 120 to customer system(s) 130. Furthermore, because the payment pages are compliant with SCA and PCI regulations, customer information is secure during the transactions performed by commerce platform server(s) 110 on behalf of merchant system(s) 120. In embodiments, commerce platform payment pages may also support additional payment methods, line items, collection of shipping info, using merchant coupon codes, etc.

As will be discussed in greater detail below, commerce platform payment pages can be fully configured in a user interface (e.g., a dashboard or other user interface) provided by the commerce platform server(s) 110 to a user of the merchant server(s) 120 prior to deployment within a merchant's web page or application. In embodiments, this can include merchant server(s) 120 providing a description of products to be sold via the payment page(s), such as a description of products representing an item being sold and SKUs or other identifiers describing specific variations of each product. After configuration, payment page(s) may then be deployed within a web page or application provided from merchant server(s) 120 to one or more customer system(s) 130 that provides merchant products/services for sale to customer system(s) 130. Because the payment pages are generated, managed, and payment processing handled via the payment pages at the commerce platform server(s) 110, and not the merchant server(s) 120, the usage of payment pages by merchant web pages/apps eliminates nearly all of the technical integration and financial regulation compliance (e.g., PCI, SCA, etc.) challenges of using a payments processor, such as the commerce platform server(s) 110, during transactions with a customer. Furthermore, the technical challenges associated with deployment of a commerce interface by the merchant are minimized through the use of the commerce platform based payment pages, as discussed herein. Additionally, payment pages can be re-configured and changed using the user interface provided by the commerce platform server(s) 110 at any time to evolve a checkout flow, add new products, remove products, etc. as needs of merchant server(s) 120 change.

In embodiments, aspects of the checkout flow may be changed. For example, visual parameters may be specified by merchant server(s) 120 within the configuration user interface provided by commerce platform server(s) 110, such as custom colors, logos, fonts, etc., and may be used by commerce platform server(s) 110 when generating payment pages so that a payment page appears as if it were provided by the merchant. One embodiment of customizing the look and feel of payment pages by a merchant is described in U.S. Pat. No. 9,940,653, issued on Apr. 10, 2018, titled "Systems and Methods for a Commerce Platform Coordinating Transactions within Third Party Applications," the disclosure of which is incorporated by reference in its entirety. For example, in embodiments, merchant server(s) 120 may provide a logo associated with the merchant, from which commerce platform server(s) 110 can extract color from the logo, fonts used in the logo (e.g., by examining encoding of the logo, performing image processing, etc.), and extracting other visual indicators associated with the logo. Then, these extracted customization parameters may be used in generating merchant specific payment pages that resemble a payment page that would be generated by merchant server(s) 120, but which is generated and served by commerce platform server(s) 110.

In embodiments, the payment pages may include one or more of tokenizing, authorizing, and/or approving one or more financial aspects associated with a transaction between a merchant and a customer of the merchant. In embodiments, a payment page may interact with commerce platform server(s) 140 to receive, handle, and process payment data from a customer using customer system 130 in such a way that it is not exposed to any merchant system thereby preventing merchant web pages, merchant apps, or the merchant server(s) 120 from being subject to the scope of PCI and SCA compliance requirements in any way. Instead, in embodiments a token or other message is generated by commerce platform server(s) 110 after authorizing a transaction with authorization network(s) 140 (e.g., card brand systems, issuing bank systems, digital wallet systems, etc.), and the token or message provided to the merchant server(s) 110 indicating that a transaction has been cleared and/or otherwise approved. The merchant server(s) 120 may then use the token or other data in a message authorizing the transaction to complete the transaction with the customer system 130 (e.g., ship the product, provide the service, etc.), and further provide the token/transaction authorization from merchant server(s) 120 to commerce platform server(s) 110 for subsequent use in obtaining remuneration identified by the token. One embodiment of techniques and systems for tokenizing transactions using services of a commerce platform are described in U.S. Pat. No. 9,830,596, issued on Nov. 28, 2017, titled "Method for Conducting a Transaction Between a Merchant Site and a Customer's Electronic Device Without Exposing Payment Information to a Server-Side Application of the Merchant Site," the disclosure of which is incorporated by reference in its entirety. In embodiments, merchant server(s) 120 may also be associated with an account at commerce platform server(s) 110, in which merchant banking information is stored. In this embodiment, merchant financial institutions, as specified in merchant accounts, may be automatically credited by commerce platform server(s) 110 periodically, as transactions are cleared, etc. In embodiments, such accountings, transaction summaries, etc. may be viewed by a user of merchant server(s) 120 in the user interfaces/dashboards provided by commerce platform server(s) 110.

In embodiments, when a customer of customer system 130 selects to purchase a product or service through a web page or app provided by merchant server(s) 120, the customer will be redirected to a web page generated and hosted by the commerce platform server(s) 110 by code within the merchant's web page/app. In embodiments, this redirection code, function, etc. may be generated by commerce platform server during registration/configuration of a payment page, and thus may be easily included in a merchant web page. The commerce platform server(s) 110 then handle the checkout process upon receiving a redirection, including collecting customer information (e.g., name, shipping address, billing address, etc.), accepting payment information, authorizing a transaction, clearing the transaction, etc. through the generation and serving of payment page(s) to a customer system 130. At the conclusion of a transaction, the customer system 130 is then redirected by the commerce platform server(s) 110 back to the merchant's web page/app once the payment is successful, or another form of conclusion is reached (e.g., payment decline, connection loss, etc.). One embodiment of using the commerce platform to coordinate transactions within the merchant web pages/apps provided to customers is described in U.S. Pat. No. 9,940,653, issued on Apr. 10, 2018, titled "Systems and Methods for a Commerce Platform Coordinating Transactions within Third Party Applications," the disclosure of which is incorporated by reference in its entirety.

Therefore, in embodiments, as discussed in greater detail herein, merchant server(s) 120 are able to provide a customized checkout experience to customer system(s) 130 through checkout pages generated and served by commerce platform server(s) 110. The technical solution represented by customized checkout pages served by commerce platform server(s) 110 greatly simplifies the integration of commerce applications for remote and network-based transactions into web pages/application provided by merchant server(s) 120 to customer system(s) 130. Furthermore, the technical solutions discussed herein, insulate merchant server(s) 120 from the deployment issues associated with financial regulation compliance, which simplifies merchant application/web page development, and thus deployment of commerce based applications. Embodiments for payment page registration and configuration are discussed below in FIGS. 2 and 4, and embodiments for using a payment page are discussed below in FIGS. 3 and 5.

Figure 2:
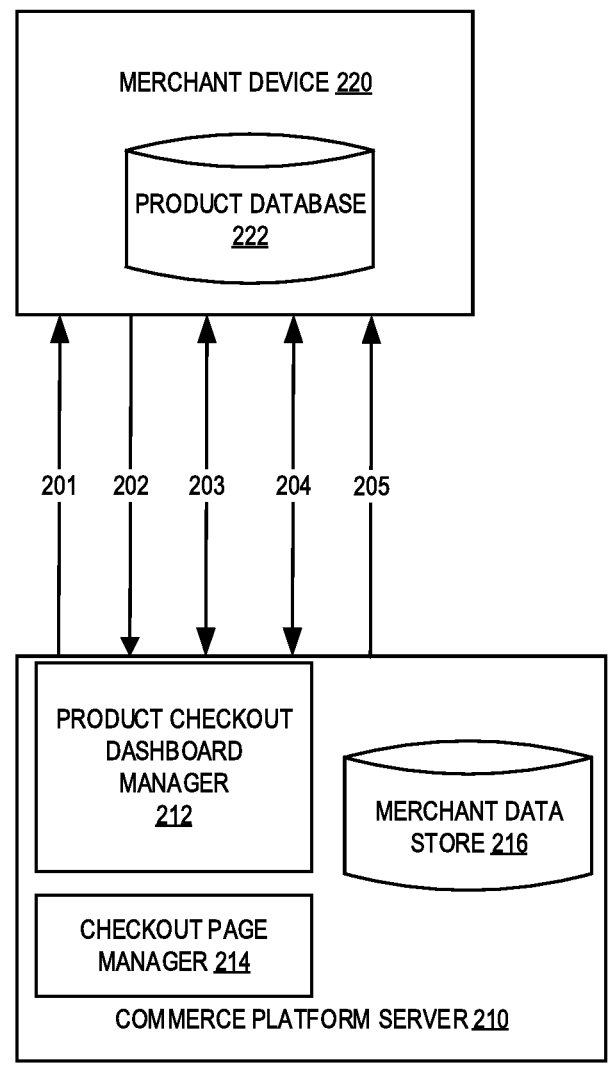
FIG. 2 is a block diagram of one embodiment of a system and process for registering and configuring commerce platform payment pages for use in a merchant web page or application.

FIG. 2 is a block diagram of one embodiment 200 of registering and configuring commerce platform payment pages for use in a merchant web page or application. Merchant device 220 and commerce platform server 210 provide additional details for the merchant server(s) 120 and commerce platform server(s) 110 discussed above in FIG. 1. In embodiments, the merchant device 220 may be a computing device (e.g., a mobile device, personal computer, server computer, etc.) associated with an authorized merchant user. In embodiments, the authorized user is a merchant user that has been authenticated by one or more of the merchant system 220 and/or the commerce platform server 210, such as by providing a username and password combination, submitting biometric data, etc. Commerce platform server 210 may be one or more server computer systems. Furthermore, the commerce platform server 210 and merchant device 220 may communicate with one another over a network, using secure and/or other protocols for the exchange of information, as discussed herein.

In embodiments, commerce platform server 210 performs a process for registering and configuring one or more payment pages with merchant system 220 utilizing processing logic including a product checkout dashboard manager 212 and a checkout page manager 214. The processing logic may comprise hardware (circuitry, dedicated logic, etc.), software (such as is run on a general purpose computer system or a dedicated machine), firmware, or a combination for performing the operations discussed herein. For example, the processing logic can reside in functions of a software development kit (SDK), and application programming interface (API), or other software/hardware including software packages, libraries, function, routines, etc. executed by or at the direction of commerce platform server 210.

In one embodiment, processing logic of product checkout dashboard manager 212 generates and transmits a user interface to merchant device accesses (operation 201). In embodiments, the user interface is a web page served to a user of the merchant device 220, for example in response to a web based request to register and/or configure one or more payment pages, that includes an authentication interface where the user authenticates himself or herself to the commerce platform server 210. For example, a merchant account may be maintained in merchant data store 216 with access credentials (e.g., usernames, passwords, encryption keys, etc.) for authorized merchant users. In embodiments, commerce platform server 210 verifies that received authentication credentials match stored authentication credentials. In one embodiment, the user interface is a business dashboard user interface that enables the user to navigate various business settings associated with the merchant (e.g., associated accounts, locations, encryption keys, account login credentials, etc. stored merchant data store 216). In one embodiment, the user of the merchant device can navigate to a checkout section associated with the registration and configuration of commerce platform payment pages to be used by the merchant server(s) (e.g., merchant server(s) 120 or 320), as discussed herein, and selects to use checkout services provided by the commerce platform server 210 via one or more payment pages.

In embodiments, in response to receipt of the selection of a merchant user to enable payment pages, processing logic of the commerce platform's checkout page manager 214 enables the use of payment pages for the merchant in a merchant data store, web page, application, etc. (operation 202). In embodiments, to complete a payment page, a specification of one or more domains (e.g., universal resource locators or other link to a network address) to be used by the merchant with commerce platform checkout pages (e.g., merchant-website.com) are also received by checkout page manager via the dashboard manager (also at operation 202), which checkout page manager 214 associates with the merchant account and the enabled payment pages in merchant data store 216. In embodiments, the one or more domains are customer-facing domain(s) where the merchant's website/application that offers products/services for sale to customers is hosted, and only the domains specified by the merchant device are permitted to redirect to commerce platform server(s) 210 during checkout originating from a merchant web page. That is, for example, a request for a payment page received by commerce platform server 210, as discussed herein, utilizes the origin of the request (e.g., the specified customer-facing domain) as a security check that a request for the payment page originated from an authorized source. When it does not, commerce platform server 210 would decide not to respond with a payment page, as discussed herein. In embodiments, the specification of domains can include one or more domains that can use commerce platform payment pages (e.g., originate a request for a payment page), and can be updated in merchant data store 216 by merchant device 220 at any time utilizing the processing logic of operation 202. Furthermore, in embodiments, the domains are also utilized by commerce platform server 210 to redirect a customer back to a merchant web page/app after checkout using payment page(s) is complete. In embodiment, the redirection may be to a specific domain, or the domain from which a checkout request was received.

In one embodiment, processing logic of the product checkout dashboard manager further receives one or more customization options for the checkout web pages associated with merchant (operation 203). In embodiments, merchant branding can be added to payment pages by commerce platform servers by configuring icons, fonts, color schemes, logos, images, formatting, etc. within payment pages. In embodiments, this customization can be applied to other aspects handled by processing logic of the commerce platform server 210, such as generation and transmission of email receipts to customer systems following completion of checkout using one or more payment pages. In embodiments, processing logic of dashboard manager may update a display provided to merchant device (operation 203) based on configuration options selected to render an example of product checkout dashboard managers interpretation of the received customization options, and to enable a user of merchant device to provide additional configuration options and/or change existing customization options. Furthermore, in embodiments, configuration options may be selected automatically by processing logic of product checkout dashboard managers in response to receipt of a logo, image, web page address, etc. associated with the merchant and having merchant branding information, as described in U.S. Pat. No. 9,940,653, issued on Apr. 10, 2018, titled "Systems and Methods for a Commerce Platform Coordinating Transactions within Third Party Applications," the disclosure of which is incorporated by reference in its entirety.

In embodiments, processing logic of the merchant device 220 and the commerce platform server 210 then interact to define what products and/or services are available for purchase using commerce platform checkout pages (operation 204). In embodiments, commerce platform server receives a specification of products and SKUs associated with those products via a products section of the product checkout dashboard user interface provided to the merchant device 220 from dashboard manager 212. In embodiments, one-time purchase products can be specified (e.g., such as a single physical product) as well as recurring products (e.g., a subscriptions). In embodiments, the received product specification for a new product can include a unique name that is to be displayed to customers on checkout using payment pages generated by commerce platform server 210. In embodiments, the data for products, SKUs, names, price, currency, images of products, and other information specified when products are created is maintained in the merchant data store 216 and associated with a merchant's commerce platform account.

Processing logic of the checkout page manager 214 then generates and returns a product identifier that is associated with the parameters defined for the new product, subscription, service, etc. in the merchant data store (operation 205). This product identifier generated by the commerce platform to refer to a product that is to be sold using commerce platform payment page(s), also referred to herein as a SKU ID, is how the merchant web page/app refers to the product to start payment processing using payment pages, as disused below. In one embodiment, the product identifier may be encoded in snippet, such a URL, portion of a URL, executable code, function in an SDK or API used by a merchant server, etc. that may be generated by commerce platform server 210 and can be placed directly within a web page/app served to the customer. Then, in embodiments, it is the receipt of a request for a payment page having a combination of origination from a specified domain (e.g., the customer-facing domain specified by merchant device 220 and received by commerce platform server at operation 202) with a valid SKU ID (e.g., an ID previously generated by commerce platform to represent a specific item, service, subscription, etc. associated with the merchant) that, at least in part in some embodiments, enables commerce platform to initiate generation of payment pages to provide a product checkout experience to a user, as discussed below.

Figure 3:
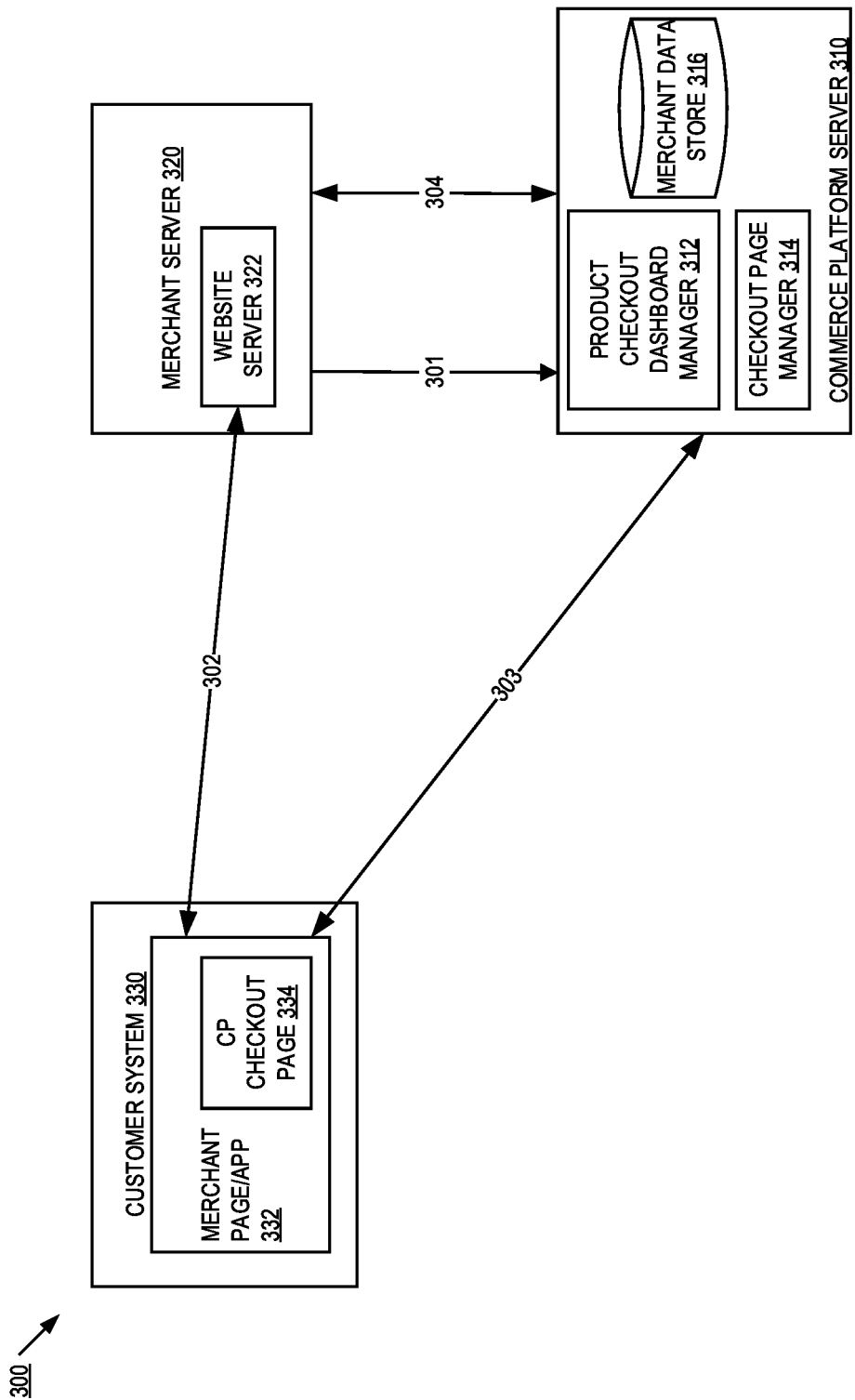
FIG. 3 is a block diagram of one embodiment of using a commerce platform payment page for checkout for purchase of a product of a merchant by a customer.

FIG. 3 is a block diagram of one embodiment 300 of a system and a process for using a commerce platform payment page for checkout for purchase of a product of a merchant by a customer. Although the term product is used, product can refer to an item for sale, a service to be provided by the merchant, a subscription, etc. Customer system 330, merchant server 320, and commerce platform server 310 provide additional details for the customer device(s) 130, merchant server(s) 120 and commerce platform server(s) 110 discussed above in FIG. 1. In embodiments, the customer device 330, commerce platform server 310, and merchant device 320 may communicate with one another over a network, as discussed here.

In embodiments, commerce platform server 310 performs a process for checkout using one or more payment pages for purchase of a product offered by merchant server 320 by a customer system 330. In embodiments, commerce platform server 310 utilizes processing logic of a dashboard managers 312 and checkout page manager 214. The processing logic may comprise hardware (circuitry, dedicated logic, etc.), software (such as is run on a general purpose computer system or a dedicated machine), firmware, or a combination for performing the operations discussed herein. In embodiments, product checkout using checkout pages relies on a javascript (JS) software development kit (SDK) executed by processing logic of the commerce platform server 310 and merchant server 320, which in embodiments is a set of APIs and functions used to complete financial transactions using the services provided by the commerce platform server 310 (e.g., functions to collect financial/transaction information, encrypt the information, exchange PCI compliant messages with authorization networks server(s) (not shown), etc.). In embodiments, and as discussed herein, the JS SDK is software provided by the commerce platform and used in web pages provided by the merchant server during financial transactions. Furthermore, in embodiments, the JS SDK enables token based and other transactions, as discussed herein, to prevent the merchant web page/app 332, the merchant server 320, and the website server 322 from PCI requirements, as discussed herein, to eliminate the merchant from the technical difficulties associated with PCI or other financial regulatory compliance requirements. One embodiment of the JS SDK is described in more detail in U.S. Pat. No. 9,830,596, issued on Nov. 28, 2017, titled "Method for Conducting a Transaction Between a Merchant Site and a Customer's Electronic Device Without Exposing Payment Information to a Server-Side Application of the Merchant Site," the disclosure of which is incorporated by reference in its entirety.

In embodiments, merchant server 320 initially includes a script tag linked to the JS SDK on the website server (not shown). The script identified in the scrip tag, in embodiments, is configured to load directly from commerce platform server (not bundled, hosted, or copied on merchant server), to ensure merchant server's insulation from PCI and SCA compliance. Furthermore, an instance of a commerce platform object is created with a publishable encryption key being provided to the commerce platform (operation 301), which the commerce platform stores in the merchant data store 316.

Then a merchant web page (or app) having at least one link to a commerce platform checkout page is then served to the customer device (operation 302). For example, images and descriptions of products each linked to commerce platform checkout pages are displayed in merchant web page/app 332 on customer device, enabling a user of customer device the ability to browse, select, and purchase via interaction with merchant server 322 at operation 302. In one embodiment, each link to commerce platform checkout pages redirects to commerce platform server. In one embodiment, the link can be associated with a function having parameters indicating the requested transaction, including one or more of the following parameters: (i) SKU ID being an identifier of a particular SKU that was previously generated by commerce platform (e.g., FIG. 2) for an item and associated with the product a customer seeks to purchase, (ii) a success URL being a URL address of a merchant web page the customer should be directed to once payment is complete, and (iii) a cancel URL being a web page of the merchant the customer should be directed to when payment is cancelled or fails for some other reason.

In response to invoking a link to purchase a product, and thus the function discussed above, an event handler running in the merchant web page 332, or web page request, redirects the user to a commerce platform checkout page 334 that is served/hosted to the customer device 330 from the commerce platform server 310 (operation 303). The commerce platform payment page(s), as discussed herein, enable the user of customer device to interact directly with commerce platform to complete purchase of a product (e.g., provide payment information, billing address, shipping address, receive authorization, and clearance for the transaction) at operation (304). In embodiments, if a redirection to the commerce platform server is unsuccessful (e.g., due to a network issue), an error message is returned that can be displayed to the user of customer system 330 within merchant page/app 332. Upon successful processing of a transaction, such as when financial information is collected, processed, and cleared, commerce platform server 310 can return a message and/or redirection to a success URL specified in the function associated with the originally selected link. In embodiments, merchant server 320 does not need to handle payment errors, as the commerce platform server 310 ensures only valid payment details are collected, and handles any payment errors within the commerce platform checkout page, such validation and recollection of incorrectly entered customer or financial information.

Then, the merchant server and the commerce platform can resolve the completed transaction (operation 304), including financial remuneration and fulfillment notifications. In embodiments, this can include exchanging tokens for token based transaction, receiving confirmation of transferred funds, etc. In embodiments, fulfillment may be handled following successful payment in various ways. In one embodiment, manual fulfillment for successful purchase may be enabled by notification message(s) generated by commerce platform 310 and sent to merchant server 320 via email messages, or with product purchase(s) confirmed via an interface provided by the product checkout dashboard manager 312.

In some embodiments, programmatic fulfillment may be provided to avoid problems associated with merchant failure to reconcile stock/product databases to reflect purchases. That is, asynchronous reconciliation may lead to issues with later customers seeking to purchase products which have already been purchases. To address this, in an embodiment, merchant server 320 or web server 322 polls for instance(s) of success pages being served to a customer system.

In another embodiment, a webhooks based technique can be used to distribute real time transaction completion information from commerce platform server 310 to merchant server 320/web server 322 to enable synchronous fulfillment/reconciliation including merchant server 320/web server 322 listening for a webhook event generated/transmitted from commerce platform server 310 confirming a charge, verify via cryptographic signatures (using the private key corresponding to the publishable key) that the webhook did come from commerce platform server 310, extracting purchase details from the webhook's event payload, and using this to fulfill a product and/or perform merchant reconciliation in real time, such as by providing the purchase details to a fulfillment function/process executed by merchant system 320 or a third party. In this embodiment, processing logic of the checkout page manager 314 generates and transmits webhook events to merchant server 320 to notify merchant server 310 when a customer completes payment via the checkout provided by the payment pages, as discussed herein. In embodiments, merchant server 320 or web server 322 may be configured with a corresponding webhook handler for the event, and use it to execute any code with fulfillment of the customer's purchase. In embodiments, to handle a webhook event generated by commerce platform server 310, merchant server 320 or web server 322 has an HTTP endpoint created on it. Furthermore, the webhook endpoint may be configured in product checkout dashboard manager 312, consistent with the discussion in FIG. 2. Then, commerce platform server sends a checkout.session.completed event when a payment pages checkout is successful, with a payload that includes a checkout session object having information about the customer, client reference ID, a product ID and/or SKU, a subscription, shipping information, or other transaction details for fulfillment of a product. In one embodiment, the webhook event having the fulfillment information within the payload is sent in operation 304 prior to redirection of customer system to a success URL or other page, waits for a period of time (e.g., 10 second) for an acknowledgement message including a status code, triggering the redirection of merchant page/app 322 in operation 303. Therefore, in embodiments using webhooks, event handlers, and the messaging discussed above, out of band programmatic fulfillment is turned into a synchronous fulfillment technique. However, in another embodiment, out of band programmatic fulfillment can also be used consistent with the previous embodiment.

Thus, merchants are able to utilize payment processing capabilities of the commerce platform server 310 to sell products within their web pages with minimal effort and/or integration. Furthermore, using the techniques discussed herein, the commerce platform checkout pages can help to preserve the look and feel of the merchant web pages, to provide a continuous customer experience. Still further, by having the commerce platform server handle financial transactions and customer financial data, the merchant web page, merchant app, merchant server(s), etc. are insulated from PCI compliance requirements.

Figure 4:
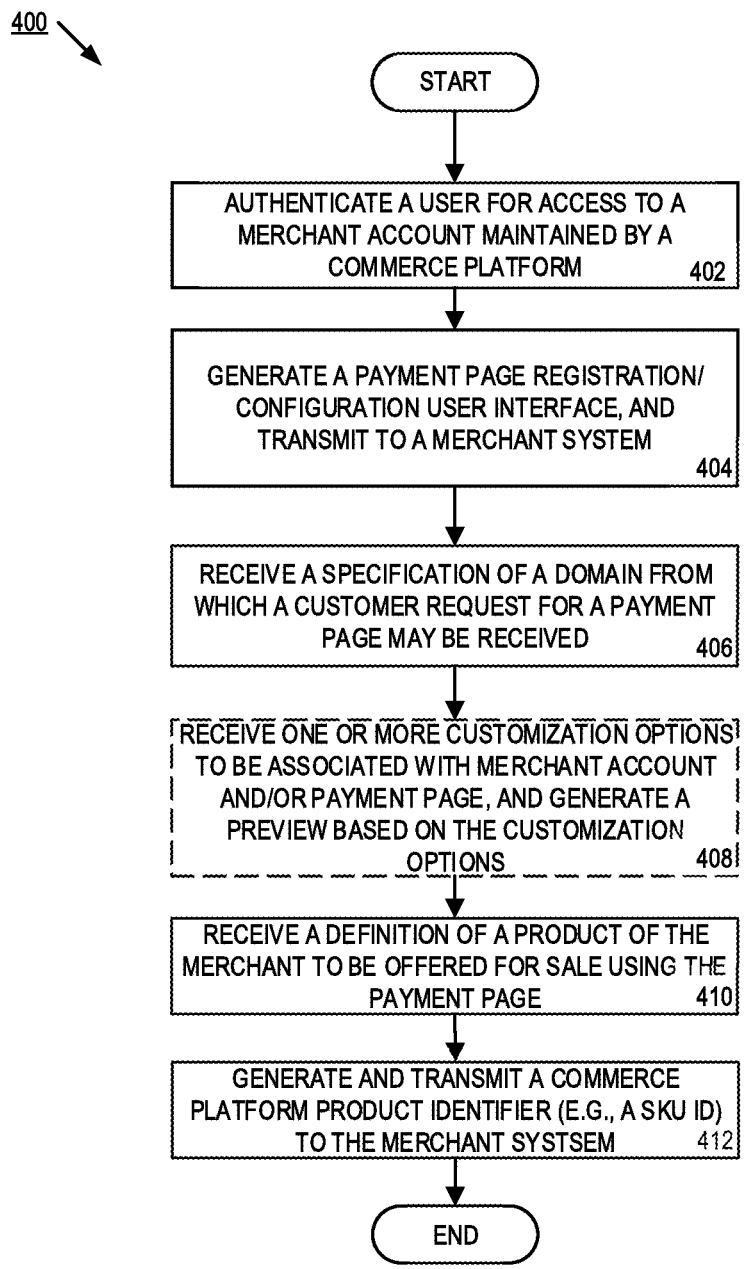
FIG. 4 illustrates one embodiment of a method for registering and configuring commerce platform payment pages for use in a merchant web page or application by a commerce platform system.

FIG. 4 illustrates one embodiment of a method 400 for registering and configuring commerce platform payment pages for use in a merchant web page or application by a commerce platform system. The method 400 is performed by processing logic that may comprise hardware (circuitry, dedicated logic, etc.), software (such as is run on a general-purpose computer system or a dedicated machine), firmware, or a combination thereof. In one embodiment, the method 400 is performed by one or more commerce platform server computer systems (e.g., commerce platform server(s) 110 or commerce platform server 210).

Referring to FIG. 4, processing logic of the commerce platform server(s) begins by authenticating a user for access to a merchant account maintained by a commerce platform (processing block 402). In embodiments, a merchant has an established account with the commerce platform, and one or more merchant users are provided with authentication credentials (e.g. usernames/password combination, biometric data, encryption keys, etc.) that enable that user, once authenticated, to access configurable account options for the merchant. In embodiments, the configurable options can include the registration and/or configuration of payment pages, as discussed herein.

Processing logic generates a payment page registration and configuration user interface, and transmits the generated user interface to a merchant system (processing block 404). In an embodiment, the merchant system is the merchant system on which the user performed authentication in operation 402. Processing logic of the commerce platform then receives a specification of a domain from which a customer request for a payment page may be received (processing block 406). As discussed herein, customer systems will be redirected from a merchant system web page/application, and the specification of allowed customer-facing domains enables processing logic of the commerce platform to ensure that the origin of payment page requests are from valid sources. That is, commerce platform does not accept all payment page requests, and instead accepts requests from approved domains.

Processing logic optionally receives one or more customization operations to be associated with the merchant account and/or payment page, and generates a preview based on the customization options (processing block 408). In embodiments, fonts, color schemes, logos, formatting, images, etc. may be specified by a merchant system for use during generation of a merchant's payment pages, so that commerce platform generated payment pages using customization options appear to have been generated by the merchant. This provides continuity to a customer utilizing the commerce platform systems payment pages during a checkout flow.

Processing logic then receives a definition of a product of the merchant to be offered for sale using the payment page (processing block 410). In embodiments, the product may be defined using various information include one or more of a description (e.g., text description, picture, review, name, size, color, etc.) and a merchant product identifier (e.g., a stock keeping unit (SKU)). Other product descriptors may be used consistent with the discussion herein. In embodiments, the product definitions may be stored in one or more records in a merchant data store maintained by the commerce platform, along with the received customization options, specified domain(s), etc.

In response to receipt of the definition of the product, processing logic generates a commerce platform product identifier and transmits the generated commerce platform product identifier to the merchant system (processing block 412). In an embodiment, the commerce platform product identifier is a globally unique identifier, referred to herein as a SKU ID, that uniquely identifiers the product of the merchant. Furthermore, the commerce platform product identifier is also stored in the merchant store and associated with the merchant's account, to enable association of the commerce platform product identifier with merchant supplied information (e.g., merchant IDs, customization options, allowed domains from which redirections may occur, etc.). Furthermore, in embodiments, the generated commerce platform product identifier may be encoded in a link, snippet of code to initiate redirection, or in text, which may be used according to the embodiments discussed herein.

Figure 5:
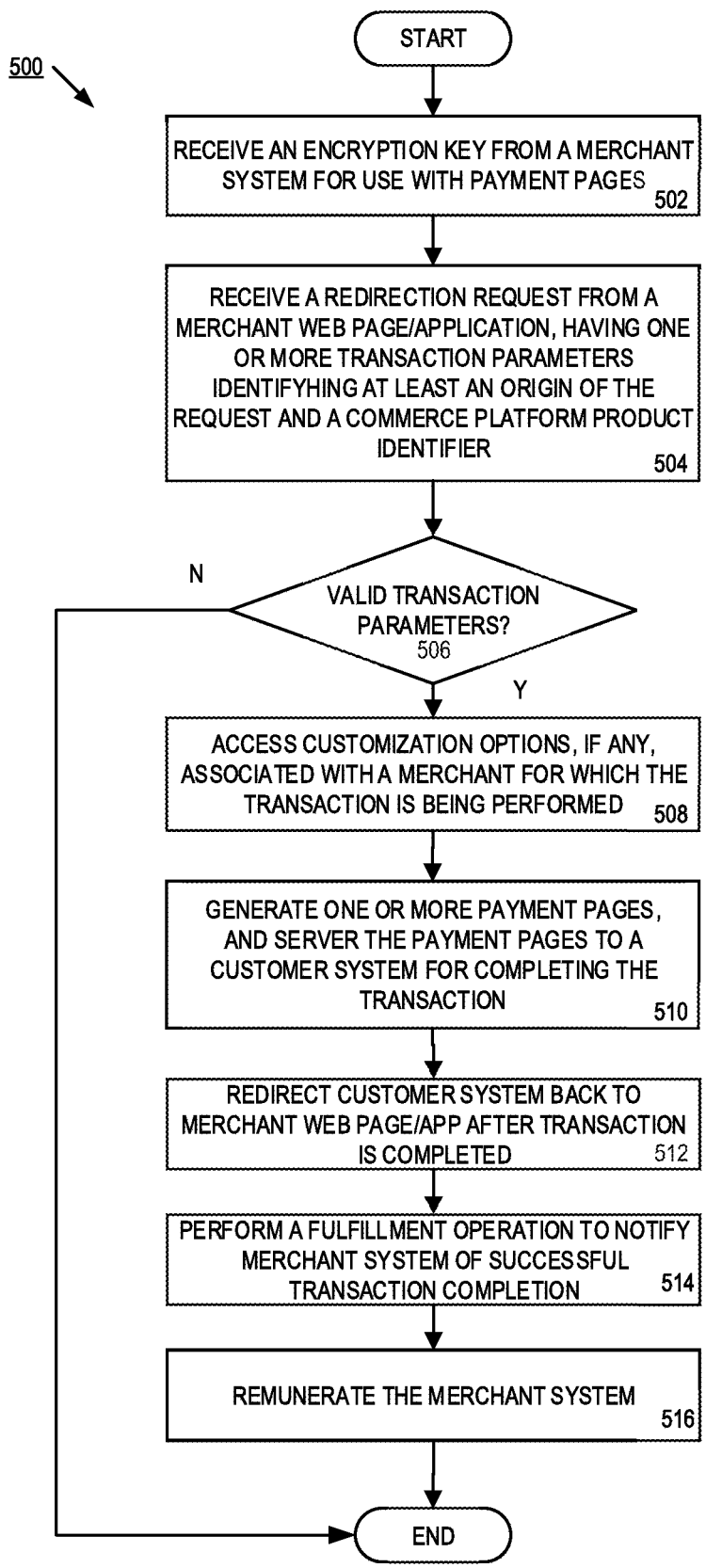
FIG. 5 illustrates one embodiment of a method for using a commerce platform payment page for checkout for purchase of a product of a merchant by a customer by a commerce platform system.

FIG. 5 illustrates one embodiment of a method 500 for using a commerce platform payment page for checkout for purchase of a product of a merchant by a customer by a commerce platform system. The method 500 is performed by processing logic that may comprise hardware (circuitry, dedicated logic, etc.), software (such as is run on a general-purpose computer system or a dedicated machine), firmware, or a combination thereof. In one embodiment, the method 400 is performed by one or more commerce platform server computer systems (e.g., commerce platform server(s) 110 or commerce platform server 310).

Referring to FIG. 5, processing logic of the commerce platform server(s) begins by receiving an encryption key from a merchant system for use with payment pages (processing block 502). In embodiments, the encryption key may be a publishable or public key generated by a merchant system or a commerce platform system and used for identifying an account of the merchant system to the commerce platform. In embodiments, the encryption key is received in a request to create an object of the commerce platform, where the request identifies the merchant's web page to the commerce platform as a web page/domain from which redirection requests may occur. In embodiments, the publishable or public key is limited in scope, and is not used, for example, by the commerce platform when receiving request for operations, such as financial transaction operations.

Processing logic receives a redirection request from a merchant web page/application, having one or more transaction parameters identifying at least an origin of the request and a commerce platform product identifier (processing block 504). In an embodiment, the redirection request may be in the form of a web page request for a payment page that, for example, has been identified to the commerce platform as discussed above. For example, a URL or other domain and content referenced by the URL or domain may be directed to a payment page. In another embodiment, the request's parameters, which can include one or more of a commerce platform product identifier (e.g., a SKU ID), a success URL where a customer system should redirected back to upon successful completion of a transaction, a cancel URL where a customer should be redirected back to upon some failure to complete a transaction (e.g., decline, communication loss, etc.), an origin domain from which the received redirection request originated, and one or more merchant identifiers.

When the transaction parameters cannot be verified by processing logic (processing block 506), the process ends. For example, in embodiments, processing logic may attempt to match a received commerce platform identifier with the domain from which the redirection request was received. As discussed herein, merchants define the allowed domains from which payment page requests can be made, and defines products that can be sold via the payment pages. Thus, in embodiments, processing logic determines whether the transaction can proceed using domain of the origination of the request and merchant defined products. In an embodiment, an error code, error message, etc. may be returned to the customer system being redirected and/or the merchant system associated with the requested redirection.

However, when the transaction parameters can be verified (processing block 506), processing logic accesses customization options, if any, associated with a merchant for which the transaction is being performed (processing block 508). In embodiment, processing logic is able to utilize one or more of the transaction parameters to determine the merchant for which the request is being processed (e.g., by unique commerce platform product identifier, origin page of request, received merchant identifier, encrypted information associated with the public key, etc.). From the merchant determination, the customization options, if any, can be accessed in, for example, a merchant data store.

Processing logic then generates one or more payment pages, and serves the payment pages to a customer system for completing the transaction (processing block 510). In embodiments, the payment pages may be customized for look and feel consistent with the customization options. Furthermore, the payment pages may include a sequence of payment pages in a checkout flow to, for example, collect customer personal information, collect customer payment information, collect customer shipping information, confirm customer information, as well as other stages of a product checkout.

Processing logic redirects the customer system back to the merchant web page/application after the transaction is completed (processing block 512). In embodiments, the redirection can include redirecting the customer system to a success and/or cancel URL received as part of the transaction parameters. Processing logic further performs fulfillment operation(s) to notify merchant system of successful completion of the transaction (processing block 514). As discussed above, the fulfillment operation can include asynchronous fulfillment, as well as generating synchronized fulfillment messaging using webhooks. In embodiments, where webhooks are used to inform a merchant system of a transaction completion in real time, processing block 514 would be configured to occur before the redirection of a customer as performed in processing block 512.

Processing logic then remunerates the merchant system for the completion of the transaction (processing block 516). In embodiments, the remuneration includes payment for the received customer transaction via token generation and distribution, as discussed herein. In other embodiments, processing logic may direct transfer remuneration to a bank or other institution associated with a particular merchant.

FIG. 6 is one embodiment of a computer system that may be used to support the systems and operations discussed herein. It will be apparent to those of ordinary skill in the art, however that other alternative systems of various system architectures may also be used.

The data processing system illustrated in FIG. 6 includes a bus or other internal communication means 615 for communicating information, and one or more processor(s) 610 coupled to the bus 615 for processing information. The system further comprises a random access memory (RAM) or other volatile storage device 650 (referred to as memory), coupled to bus 615 for storing information and instructions to be executed by processor(s) 610. Main memory 650 also may be used for storing temporary variables or other intermediate information during execution of instructions by processor(s) 610. The system also comprises a read only memory (ROM) and/or static storage device 620 coupled to bus 615 for storing static information and instructions for processor(s) 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor(s) 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for a commerce platform system conducting a transaction with a customer system of a merchant system, the method comprising:

receiving, over a communications network by the commerce platform system from the customer system, a request to purchase a product offered for sale by the merchant system, the request to purchase the product generated within a user interface served to the customer system by the merchant system, the request to purchase the product comprising transaction parameter data indicating (i) a domain name associated with the merchant system from which the request to purchase the product was initiated and (ii) a commerce platform product identifier;

verifying, by the commerce platform system, the transaction parameter data of the request to purchase the product by determining that: (i) the domain name from which the request to purchase the product was initiated originated from an authorized domain name specified by the merchant system prior to the request to purchase the product, and (ii) the domain name from which the request to purchase the product was initiated and the commerce platform product identifier are associated with one another prior to the request to purchase the product in a merchant data store maintained by the commerce platform system;

in response to verification of the transaction parameters of the request to purchase the product, redirecting the customer system to a payment page served by the commerce platform system, wherein the payment page presents the product of the merchant for purchase by the customer system;

clearing, by the commerce platform system with one or more authorization network systems, the purchase of the product from the payment page by the customer system;

generating a checkout complete webhook event to a webhook handler of the merchant system to notify the merchant system that the customer system has purchased the product, wherein the webhook handler is configured by the merchant system in a registration user interface generated by the commerce platform and provided to the merchant system;

transmitting the checkout complete webhook event to webhook handler of the merchant system; and redirecting, by the commerce platform system, the customer system back to a second user interface provided to the customer system by the merchant system after transmitting the checkout complete webhook event.

2. The method of claim 1, further comprising:

in response to a failure of verification of the transaction parameters of the request to purchase the product, generating an error message and transmitting the error message to the customer system from the commerce platform system in response to determining that the domain and the commerce platform product identifier are not associated with one another.

3. The method of claim 1, wherein the request to purchase the product further comprises data indicating (i) a success domain address linked to the second user interface and (ii) a cancel domain address linked to a user interface that displays an error message to the customer system by the merchant system.

4. The method of claim 1, wherein the commerce platform product identifier comprises a globally unique identifier for all products for which payment pages may be generated by commerce platform system on behalf of a plurality of different merchant systems.

5. The method of claim 1, further comprising:

generating and transmitting, from the commerce platform system to the merchant system, a registration user interface for registering the product for use with the payment page;

receiving, from the merchant system through the registration user interface, the domain name and a merchant product identifier associated with the product;

generating, by the commerce platform, the commerce platform product identifier; and generating an association between the domain name, the commerce platform product identifier, and a merchant account associated with merchant system in the merchant data store.

6. The method of claim 5, further comprising:

receiving, from the merchant system through the registration user interface, a customization option for generating a customized version of the payment page, wherein the customization option is specified by a user of the merchant system and comprises a color scheme, font type, a font size, a logo, or a combination thereof consistent with visual elements of the user interface presented to the customer system by the merchant system;

associating the customization option with the merchant system in the merchant data store;

identifying, prior to redirecting the customer system to the payment page, the merchant system from among a plurality of merchant system based at least in part on the domain name, the commerce platform product identifier, or a combination thereof; and generating the payment page based on the customization options when redirecting the customer system to the payment page.

7. The method of claim 1, wherein the payment page comprises a sequence of one or more payment pages in a product checkout flow comprising a customer information collection payment page, a customer payment details payment pages, a customer shipping information payment page, and a customer verification payment page, or a combination thereof.

8. The method of claim 1, wherein the checkout complete webhook event comprises data indicative of a customer system identifier, product identifier of the merchant for the product purchased by the customer system, shipping information, or a combination thereof.

9. A non-transitory computer readable storage medium including instructions that, when executed by a processor, cause the processor to perform a method for a commerce platform system conducting a transaction with a customer system of a merchant system, the method comprising:

receiving, over a communications network by the commerce platform system from the customer system, a request to purchase a product offered for sale by the merchant system, the request to purchase the product generated within a user interface served to the customer system by the merchant system, the request to purchase the product comprising transaction parameter data indicating (i) a domain name associated with the merchant system from which the request to purchase the product was initiated and (ii) a commerce platform product identifier;

verifying, by the commerce platform system, the transaction parameter data of the request to purchase the product by determining that: (i) the domain name from which the request to purchase the product was initiated originated from an authorized domain name specified by the merchant system prior to the request to purchase the product, and (ii) the domain name from which the request to purchase the product was initiated and the commerce platform product identifier are associated with one another prior to the request to purchase the product in a merchant data store maintained by the commerce platform system;

in response to verification of the transaction parameters of the request to purchase the product, redirecting the customer system to a payment page served by the commerce platform system, wherein the payment page presents the product of the merchant for purchase by the customer system;

clearing, by the commerce platform system with one or more authorization network systems, the purchase of the product from the payment page by the customer system;

generating a checkout complete webhook event to a webhook handler of the merchant system to notify the merchant system that the customer system has purchased the product, wherein the webhook handler is configured by the merchant system in a registration user interface generated by the commerce platform and provided to the merchant system;

transmitting the checkout complete webhook event to webhook handler of the merchant system; and redirecting, by the commerce platform system, the customer system back to a second user interface provided to the customer system by the merchant system after transmitting the checkout complete webhook event.

10. The non-transitory computer readable storage medium of claim 9, further comprising:

in response to a failure of verification of the transaction parameters of the request to purchase the product, generating an error message and transmitting the error message to the customer system from the commerce platform system in response to determining that the domain and the commerce platform product identifier are not associated with one another.

11. The non-transitory computer readable storage medium of claim 9, wherein the request to purchase the product further comprises data indicating (i) a success domain address linked to the second user interface and (ii) a cancel domain address linked to a user interface that displays an error message to the customer system by the merchant system.

12. The non-transitory computer readable storage medium of claim 9, wherein the commerce platform product identifier comprises a globally unique identifier for all products for which payment pages may be generated by commerce platform system on behalf of a plurality of different merchant systems.

13. The non-transitory computer readable storage medium of claim 9, further comprising:
generating and transmitting, from the commerce platform system to the merchant system, a registration user interface for registering the product for use with the payment page;
receiving, from the merchant system through the registration user interface, the domain name and a merchant product identifier associated with the product;
generating, by the commerce platform, the commerce platform product identifier; and
generating an association between the domain name, the commerce platform product identifier, and a merchant account associated with merchant system in the merchant data store.

14. The non-transitory computer readable storage medium of claim 13, further comprising:
receiving, from the merchant system through the registration user interface, a customization option for generating a customized version of the payment page, wherein the customization option is specified by a user of the merchant system and comprises a color scheme, font type, a font size, a logo, or a combination thereof consistent with visual elements of the user interface presented to the customer system by the merchant system;
associating the customization option with the merchant system in the merchant data store;
identifying, prior to redirecting the customer system to the payment page, the merchant system from among a plurality of merchant system based at least in part on the domain name, the commerce platform product identifier, or a combination thereof; and
generating the payment page based on the customization options when redirecting the customer system to the payment page.

15. The non-transitory computer readable storage medium of claim 9, wherein the payment page comprises a sequence of one or more payment pages in a product checkout flow comprising a customer information collection payment page, a customer payment details payment pages, a customer shipping information payment page, and a customer verification payment page, or a combination thereof.

16. The non-transitory computer readable storage medium of claim 9, wherein the checkout complete webhook event comprises data indicative of a customer system identifier, product identifier of the merchant for the product purchased by the customer system, shipping information, or a combination thereof.

17. A commerce platform system for conducting a transaction with a customer system of a merchant system, the commerce platform system comprising:
a memory; and
a processor coupled with the memory, the processor configured to:
receive, over a communications network by the commerce platform system from the customer system, a request to purchase a product offered for sale by the merchant system, the request to purchase the product generated within a user interface served to the customer system by the merchant system, the request to purchase the product comprising transaction parameter data indicating (i) a domain name associated with the merchant system from which the request to purchase the product was initiated and (ii) a commerce platform product identifier,
verify the transaction parameter data of the request to purchase the product by determining that: (i) the domain name from which the request to purchase the product was initiated originated from an authorized domain name specified by the merchant system prior to the request to purchase the product, and (ii) the domain name from which the request to purchase the product was initiated and the commerce platform product identifier are associated with one another prior to the request to purchase the product in a merchant data store maintained by the commerce platform system,
in response to a verification of the transaction parameters of the request to purchase the product, redirect the customer system to a payment page served by the commerce platform system, wherein the payment page presents the product of the merchant for purchase by the customer system,
clear, by the commerce platform system with one or more authorization network systems, the purchase of the product from the payment page by the customer system,
generate a checkout complete webhook event to a webhook handler of the merchant system to notify the merchant system that the customer system has purchased the product, wherein the webhook handler is configured by the merchant system in a registration user interface generated by the commerce platform and provided to the merchant system;
transmit the checkout complete webhook event to webhook handler of the merchant system, and
redirect, by the commerce platform system, the customer system back to a second user interface provided to the customer system by the merchant system after transmitting the checkout complete webhook event.

18. The commerce platform system of claim 17, wherein the processor is further configured to:
in response to a failure of verification of the transaction parameters of the request to purchase the product, generate an error message and transmitting the error message to the customer system from the commerce platform system in response to determining that the domain and the commerce platform product identifier are not associated with one another.

19. The commerce platform system of claim 17, wherein the payment page comprises a sequence of one or more payment pages in a product checkout flow comprising a customer information collection payment page, a customer payment details payment pages, a customer shipping information payment page, and a customer verification payment page, or a combination thereof.

* * * * *